United States Patent
Moser et al.

(10) Patent No.: US 6,514,904 B1
(45) Date of Patent: Feb. 4, 2003

(54) HYDROCARBON CONVERSION CATALYST AND PROCESS OF USING THEREOF

(75) Inventors: Mark D. Moser, Elk Grove Village, IL (US); Robin E. Shepherd, Haughton, LA (US); Andrzej Z. Ringwelski, Marengo, IL (US); John Y. G. Park, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/154,059

(22) Filed: May 22, 2002

Related U.S. Application Data

(63) Continuation-in-part of application No. 09/754,677, filed on Jan. 4, 2001, now abandoned, which is a continuation-in-part of application No. 09/586,829, filed on Jun. 5, 2000, now abandoned.

(51) Int. Cl.$^7$ ............... B01J 23/00; B01J 23/40; B01J 23/58; B01J 23/56; C10G 35/06

(52) U.S. Cl. ............ 502/323; 502/322; 502/327; 502/328; 502/329; 502/330; 502/332; 502/333; 502/334; 502/335; 502/336; 502/337; 502/338; 502/339; 502/341; 502/342; 502/351; 502/355; 502/415; 502/439; 208/136; 208/137; 208/138; 208/139

(58) Field of Search ............... 502/302–308, 502/310, 313–317, 322, 323, 327–330, 332, 335–338, 341, 342, 351, 355, 415, 439, 333, 334, 339; 208/136, 137, 138, 139

(56) References Cited

U.S. PATENT DOCUMENTS

| | | | |
|---|---|---|---|
| 3,920,615 A | 11/1975 | Huang | 260/683.3 |
| 4,012,337 A * | 3/1977 | Mitchell, III | 252/439 |
| 4,080,313 A | 3/1978 | Whittam | 562/455 R |
| 4,154,812 A | 5/1979 | Sanchez et al. | 423/626 |
| 4,301,037 A | 11/1981 | Sanchez et al. | 252/462 |
| 4,390,456 A | 6/1983 | Sanchez et al. | 252/448 |
| 4,483,693 A | 11/1984 | White et al. | 48/213 |
| 4,522,935 A | 6/1985 | Robinson et al. | 502/223 |
| 4,529,505 A | 7/1985 | Robinson et al. | 208/139 |
| 4,677,094 A | 6/1987 | Moser et al. | 502/227 |
| 4,714,540 A * | 12/1987 | Moser et al. | 208/139 |
| 4,737,483 A | 4/1988 | Moser et al. | 502/227 |
| 4,767,523 A | 8/1988 | Kukes et al. | 208/217 |
| 4,775,953 A | 10/1988 | Neal et al. | 502/415 |
| 4,820,676 A | 4/1989 | Kukes et al. | 502/220 |
| 4,865,719 A * | 9/1989 | Moser et al. | 208/139 |
| 4,964,975 A | 10/1990 | Chao et al. | 208/139 |
| 5,106,800 A * | 4/1992 | Moser et al. | 502/53 |
| 5,229,347 A | 7/1993 | Prada et al. | 502/221 |
| 5,314,614 A * | 5/1994 | Moser et al. | 208/262.1 |
| 5,552,035 A | 9/1996 | Potter et al. | 208/135 |
| 6,066,251 A | 5/2000 | Chen et al. | 208/138 |
| 6,214,764 B1 | 4/2001 | Gillespie | 502/230 |

FOREIGN PATENT DOCUMENTS

| CA | 1020958 | 11/1977 | ............ 260/675.1 |
|---|---|---|---|

* cited by examiner

Primary Examiner—Stanley S. Silverman
Assistant Examiner—Cam N. Nguyen
(74) Attorney, Agent, or Firm—John G. Tolomei; Frank S. Molinaro; Thomas K. McBride, Jr.

(57) ABSTRACT

A catalyst and a process for using the catalyst are disclosed generally for the conversion of hydrocarbons. By the use of at least one high temperature calcination under dry conditions, a catalyst with a beneficial combination of lowered surface area and excellent piece crush is created. X-ray diffraction pattern information is used to distinguish the resulting product.

20 Claims, 2 Drawing Sheets

# HYDROCARBON CONVERSION CATALYST AND PROCESS OF USING THEREOF

CROSS-REFERENCE TO RELATED APPLICATION

This application is a continuation-in-part of prior application Ser. No. 09/754,677 filed Jan. 4, 2001, now abandoned, which is a continuation-in-part of prior Ser. No. 09/586,829 filed Jun. 5, 2000, now abandoned, the contents of which are incorporated herein by reference.

FIELD OF THE INVENTION

This invention relates to a shaped catalyst prepared by using a dry high temperature calcination that gives a characteristic x-ray pattern, and a process for using the catalyst for hydrocarbon conversion.

BACKGROUND OF THE INVENTION

The controlled adjustment of a significant hydrocarbon conversion catalyst property of surface area has been found to be possible along with the maintenance and even improvement of another significant catalyst property of piece crushing strength. Surface area can allow acidic and metal supported reactions to occur, while piece crush strength permits catalyst particles to maintain their integrity, and thus their useful life.

U.S. Pat. No. 3,920,615 (Huang) discloses a calcination treatment of at least 800° C. which is used to reduce the surface area of an alumina catalyst to between 10 $m^2$/gm and 150 $m^2$/gm. The catalyst displays improved selectivity in a process for long chain mono-olefin dehydrogenation from paraffins as part of the production of alkylaryl sulfonates. No mention is made of the resulting piece crushing strength from the procedure.

Canadian Patent No. 1,020,958 (Masologites) discloses a catalyst consisting of at least one platinum group component used in a reaction zone with a hydrocarbon and hydrogen under conditions causing coke deposition on the catalyst. The catalyst is regenerated by oxidation and the process is repeated until the surface area is between 20 and 90% of the original value. The catalyst is then treated to incorporate at least one promoter metal selected from the group of Re, Ge, Ir, Sn, Au, Cd, Pb, rare earths, or a mixture thereof. The resulting catalyst shows increased stability in use thus requiring less frequent regeneration or replacement. Again, no mention is made of the resulting piece crushing strength from this procedure.

Applicants have found that piece crushing strength is a very important property for catalysts. This has been recognized in the art pertaining to hydrotreatment as disclosed in U.S. Pat. No. 4,767,523 and U.S. Pat. No. 4,820,676 (Kukes et al.) where a solution of ammonium sulfate is used to treat alumina such that after calcination the strength of the alumina is increased when measured under high pressure fixed bed hydrotreating conditions.

Piece crushing strength is an even more important property for moving bed applications. When catalyst particles are moving through a reaction zone, higher piece crushing strength leads to less catalyst attrition and deterioration to fines. Catalysts with poor strength more often fracture, generating dust and catalyst fines that can become trapped against reactor screens. This can lead to blocked flow of reactants and products, which often may require a reforming unit to shut down for screen cleaning. Many commercial moving bed systems require catalyst make up in order to replace catalyst inventory lost to fines, dust, or cracked chips.

U.S. Pat. No. 5,552,035 (Potter et al.) discloses a method for hydro-thermally calcining an extruded bound zeolitic catalyst that can be used in a fixed bed reforming process, where calcination improves catalyst strength. In contrast to Potter et al., applicants have found that dry calcination gives even better retention of catalyst strength. By studying the controlled use of steam as part of the state-of-the-art Potter et al. disclosed hydro-thermal calcination evaluation, applicants obtained a surprising result by removing the Potter et al. disclosed 30 volume % to 100 volume % water from the calcination atmosphere. In fact, it was found that this water was causing substantial loss of piece crushing strength in achieving a desired reduction in catalyst surface area. By conducting a calcination at substantially dry conditions such that the moisture level remains less than 4 mass %, and preferably less than 3 mass %, an excellent combination of piece crushing strength and reduced surface area was obtained.

U.S. Pat. No. 4,483,693 (White et al.) discloses a process for steam reforming of hydrocarbons in the presence of greater than 1 ppm sulfur using a catalyst comprising an alumina with a surface area from about 30 to about 160 $m^2$/g formed by calcination of pure single phase boehmite. No information is provided regarding calcination water content or catalyst strength

SUMMARY OF THE INVENTION

A broad embodiment of the present invention is a shaped catalyst comprising an alumina support where the catalyst is treated with a dry high temperature calcination at a time and temperature sufficient to produce a catalyst characterized with a X-ray powder diffraction pattern such that the ratio of peak intensities at respective two-Θ Bragg angle values of 32.5:34.0 is at least about 1.2, and the ratio of peak intensities at respective two-Θ Bragg angle values of 46.0:45.5 is at most about 1.1. The catalyst has a surface area from about 140 $m^2$/gm to about 210 $m^2$/gm and a piece crush strength of at least about 34 N/mm. This amounts to a surface area reduction from about 5% to about 30% of the original support as analyzed prior to the dry high temperature calcination with a concomitant maintenance of piece crush strength of greater than 95% of the original support as analyzed prior to the dry high temperature calcination.

Optionally, the catalyst has at least one platinum group metal dispersed thereon along with a halogen component, especially chlorine, and further optionally an additional promoter metal element selected from the group consisting of rhenium, tin, germanium, cerium, europium, indium, and phosphorous. A preferred shape is substantially spherical.

The catalyst is useful in a catalytic reforming process for converting gasoline-range hydrocarbons, especially in the presence of less than 1 ppm sulfur. When the catalyst contains an alkali or alkaline-earth metal, the catalyst is useful in a dehydrogenation process.

Additional objects, embodiments and details of this invention can be obtained from the following detailed description of the invention.

DETAILED DESCRIPTION OF THE INVENTION

Figure 1:
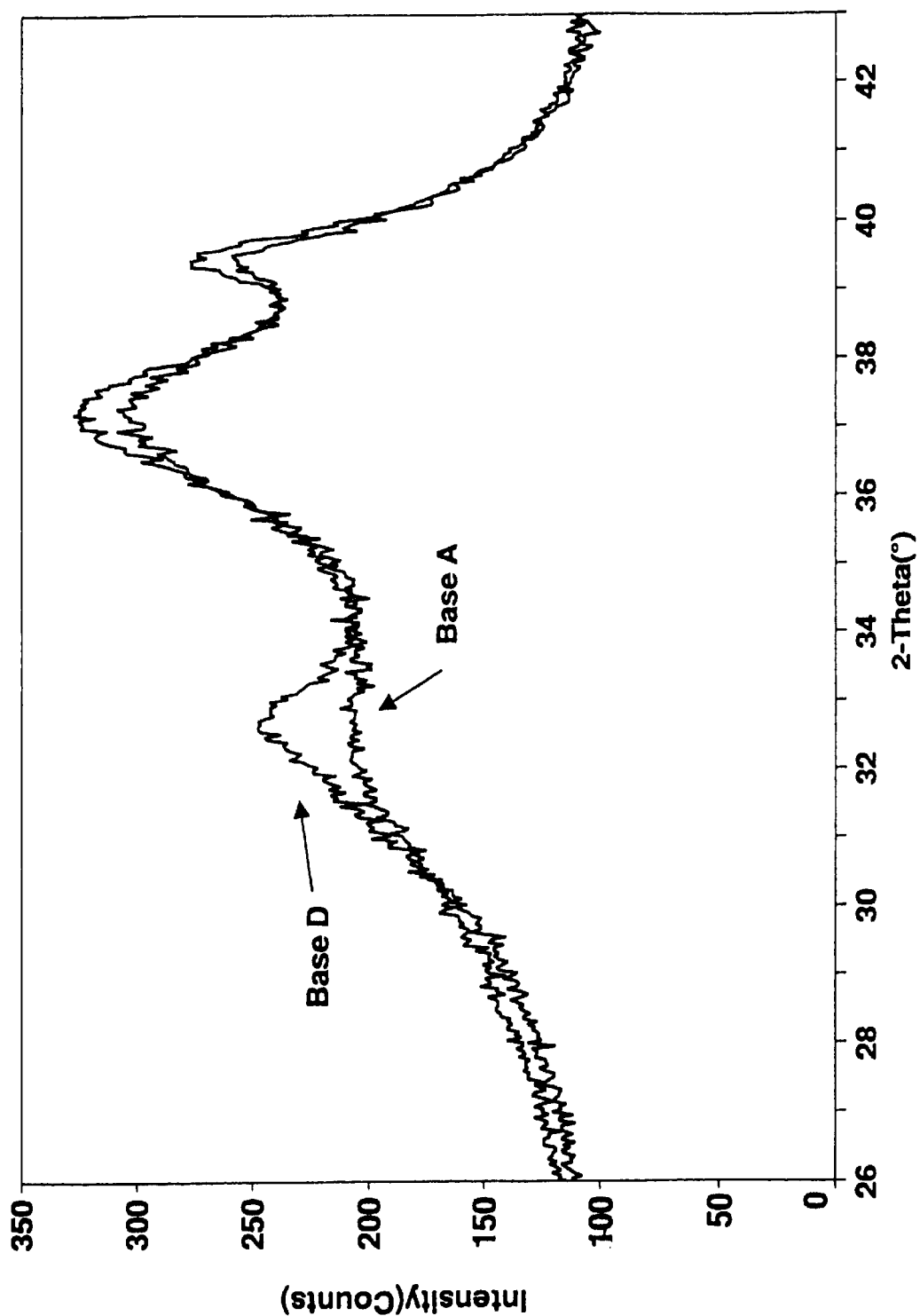
FIG. 1 shows an X-ray diffraction pattern for a catalyst of the invention (Base D) compared to a reference (Base A) over the range 2-theta 43 to 26.

A broad embodiment of the present invention, therefore, is a shaped alumina catalyst which is prepared by calcining shaped alumina particles at a time, temperature, and moisture level sufficient to produce a catalyst with a characteristic X-ray pattern that has desirable surface area and excellent piece crush strength.

Suitable alumina materials are the crystalline aluminas known as the gamma, eta, and theta phase aluminas, with gamma or eta phase aluminas giving best results. A preferred alumina is that which has been characterized in U.S. Pat. Nos. 3,852,190 and 4,012,313 as a by-product from a Ziegler higher alcohol synthesis reaction as described in Ziegler's U.S. Pat. No. 2,892,858. For purposes of simplification, such an alumina will be hereinafter referred to as a "Ziegler alumina". Ziegler alumina is presently available from the Vista Chemical Company under the trademark "Catapal" or from Condea Chemie GmbH under the trademark "Pural." This material is an extremely high purity pseudoboehmite which, after calcination at a high temperature, has been shown to yield a high purity gamma-alumina.

The preferred form of the present catalyst is a sphere. Alumina spheres may be continuously manufactured by the well known oil-drop method which comprises: forming an alumina slurry with Ziegler alumina or an alumina hydrosol by any of the techniques taught in the art and preferably by reacting aluminum metal with hydrochloric acid; combining the resulting hydrosol or slurry with a suitable gelling agent; and dropping the resultant mixture into an oil bath maintained at elevated temperatures. The droplets of the mixture remain in the oil bath until they set and form gelled spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 150° C. to about 205° C. and subjected to a calcination procedure at a temperature of about 450° C. to about 700° C. for a period of about 1 to about 20 hours. This treatment effects conversion of the alumina hydrogel to the corresponding crystalline gamma-alumina. U.S. Pat. No. 2,620,314 provides for additional details and is incorporated herein by reference thereto. The use of the term "substantially spherical" refers to the geometric properties of most of the spheres being round and includes slight deviations.

An alternate form of the present catalyst is a cylindrical extrudate. A "substantially cylindrical" catalyst, defined with geometric properties of most of the cylinders being circular in one direction and linear in another, and including slight deviations therefrom, can be prepared by any of the well known to the art forming methods such as extrusion. The preferred extrudate form is prepared by mixing Ziegler alumina powder with water and suitable peptizing agents, such as nitric acid, acetic acid, aluminum nitrate and like materials, to form an extrudable dough having a loss on ignition (LOI) at 500° C. of about 45 to about 65 mass-%. The resulting dough is extruded through a suitably shaped and sized die to form extrudate particles, which can be dried at a relatively low temperature of about 150° C. to about 205° C. and subjected to a calcination procedure at a temperature of about 450° C. to about 700° C. for a period of about 1 to about 20 hours.

Moreover, spherical particles can also be formed from the extrudates by rolling the extrudate particles on a spinning disk. An average particle diameter can vary from 1 mm to 10 mm, with the preferred particle diameter being approximately 3 mm.

After shaping, the catalyst is subjected to at least one calcination treatment. Preferably, this calcination is conducted at conditions selected to create a product catalyst comprising a calcined alumina with a characteristic X-ray pattern and desired physical properties in terms of surface area and piece crushing strength. This calcination typically takes place at a temperature of from about 700° C. to about 900° C., a moisture level of less than 4 mass % steam and a time of about 15 minutes to about 20 hours. More preferably the calcination conditions comprise a temperature from about 800° C. to about 900° C., a moisture level of less than 3 mass % steam and a time limit of about 30 minutes to about 6 hours. An oxygen atmosphere is employed typically comprising dry air. Dry air is considered air with no added moisture or steam, ranging from air that has been dried using chemical means such as molecular sieves or silica gels to ambient moisture levels. Generally the exact period of time being that required in order to reach the desired calcined alumina physical properties of surface area and piece crush strength. The relative amount of surface area reduction will be approximately between about 5 to about 30%. Further, the piece crush strength will be reduced at most to about 95% of the original value. The piece strength can also increase due to this calcination such that greater than a 100% of the original value may be obtained.

Therefore, if the alumina prior to this calcination treatment has a surface area between 200 and 220 m$^2$/gm, then the calcined alumina will have a surface area between about 140 m$^2$/gm and about 210 m$^2$/gm (measured by BET/N$_2$ method, ASTM D3037, or equivalent). Preferably the calcined alumina will have a surface area from between about 150 m$^2$/gm and about 180 m$^2$/gm. Likewise, if the piece crush strength of the alumina prior to this calcination treatment is 36 N/mm, then the calcined alumina obtained is at least 34 N/mm (average reported by ASTM D4179 or equivalent). Preferably the calcined alumina will have a piece crush strength greater than about 36 N/mm, and more preferably greater than about 40 N/mm. Note that this time requirement will, of course, vary with the calcination temperature employed and the oxygen content of the atmosphere employed. Note also that the alumina prior to this calcination treatment can have a surface area range from between about 180 m$^2$/gm and about 240 m$^2$/gm, with the preferred range being from about 200 m$^2$/gm to about 220 m$^2$/gm as illustrated above.

The best results are achieved when the catalyst has an X-ray diffraction pattern showing characteristic intensities of peaks at specified Bragg angle positions. Specifically, the preferred catalyst has an X-ray powder diffraction pattern such that the ratio of peak intensities at respective two-Θ Bragg angle positions of about 32.5:34.0 is at least about 1.2 and the ratio of peak intensities at respective two-Θ Bragg angle values of about 46.0:45.5 is at most about 1.1. The X-ray pattern may be obtained by standard X-ray powder diffraction techniques, of which a suitable example is described hereinbelow. Typically, the radiation source is a high-intensity, copper-target, X-ray tube operated at 45 KV and 35 mA. Flat compressed powder samples illustratively are scanned in a continuous mode with a step size of 0.030° and a dwell time of 9.0 seconds on a computer-controller diffractometer. The diffraction pattern from the copper K radiation may be recorded with a Peltier effect cooled solid-state detector. The data suitably are stored in digital format in the controlling computer. The peak heights and peak positions are read from the computer plot as a function of two times theta (two-Θ)), where theta is the Bragg angle.

An optional ingredient of the catalyst is a platinum-group-metal component. This component comprises platinum, palladium, ruthenium, rhodium, iridium, osmium or mixtures thereof, with platinum being preferred. The platinum-group metal may exist within the final catalytic composite as a compound such as an oxide, sulfide, halide, oxyhalide, etc., in chemical combination with one of more of the other ingredients of the composite or as an elemental metal. The best results are obtained when substantially all the platinum-group metal component is present in the elemental state and it is homogeneously dispersed within the carrier material. The platinum-group metal component may be present in the final catalyst composite in any amount that is catalytically effective; the platinum-group metal generally will comprise about 0.01 to about 2 mass % of the final catalytic composite, calculated on an elemental basis. Excellent results are obtained when the catalyst contains about 0.05 to about 1 mass % platinum.

The platinum-group metal component may be incorporated in the support in any suitable manner, such as coprecipitation, ion-exchange or impregnation. The preferred method of preparing the catalyst involves the utilization of a soluble, decomposable compound of a platinum-group metal to impregnate the carrier material in a relatively uniform manner. For example, the component may be added to the support by commingling the support with an aqueous solution of chloroplatinic or chloroiridic or chloropalladic acid. Other water-soluble compounds or complexes of platinum-group metals may be employed in impregnating solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diamminepalladium (II) hydroxide, tetramminepalladium (II) chloride, hexamminerhodium chloride, rhodium carbonylchloride, rhodium trichloride hydrate, rhodium nitrate, sodium hexachlororhodate (III), sodium hexanitrorhodate (III), iridium tribromide, iridium dichloride, iridium tetrachloride, sodium hexanitroiridate (III), potassium or sodium chloroirinate, potassium rhodium oxalate, etc. The utilization of a platinum, iridium, rhodium, or palladium chloride compound, such as chloroplatinic, chloroiridic or chloropalladic acid or rhodium trichloride hydrate, is preferred since it facilitates the incorporation of both the platinum-group-metal component and at least a minor quantity of the preferred halogen component in a single step. Hydrogen chloride or the like acid is also generally added to the impregnation solution in order to further facilitate the incorporation of the halogen component and the uniform distribution of the metallic components throughout the carrier material. In addition, it is generally preferred to impregnate the carrier material after calcination in order to minimize the risk of washing away the valuable platinum-group metal.

Generally the platinum-group metal component is dispersed homogeneously in the catalyst. Preferably, homogeneous dispersion of the platinum-group metal is determined by Scanning Transmission Electron Microscopy (STEM), comparing metals concentrations with overall catalyst metal content. In an alternative embodiment one or more platinum-group metal components may be present as a surface-layer component as described in U.S. Pat. No. 4,677,094, incorporated herein by reference. The "surface layer" is the layer of a catalyst particle adjacent to the surface of the particle, and the concentration of surface-layer metal tapers off when progressing from the surface to the center of the catalyst particle.

A Group IVA(IUPAC 14) metal component is an optional ingredient of the catalyst of the present invention. Of the Group IVA(IUPAC 14) metals, germanium and tin are preferred and tin is especially preferred. The component may be present as an elemental metal, as a chemical compound such as the oxide, sulfide, halide, oxychloride, etc., or as a physical or chemical combination with the porous carrier material and/or other components of the catalytic composite. Preferably, a substantial portion of the Group IVA(IUPAC 14) metal exists in the finished catalyst in an oxidation state above that of the elemental metal. The Group IVA(IUPAC 14) metal component optimally is utilized in an amount sufficient to result in a final catalytic composite containing about 0.01 to about 5 mass % metal, calculated on an elemental basis, with best results obtained at a level of about 0.1 to about 2 mass % metal.

The Group IVA(IUPAC 14) metal component may be incorporated in the catalyst in any suitable manner to achieve a homogeneous dispersion, such as by coprecipitation with the porous carrier material, ion-exchange with the carrier material or impregnation of the carrier material at any stage in the preparation. One method of incorporating the Group IVA(IUPAC 14) metal component into the catalyst composite involves the utilization of a soluble, decomposable compound of a Group IVA(IUPAC 14) metal to impregnate and disperse the metal throughout the porous carrier material. The Group IVA(IUPAC 14) metal component may be impregnated either prior to, simultaneously with, or after the other components are added to the carrier material. Thus, the Group IVA(IUPAC 14) metal component may be added to the carrier material by commingling the carrier material with an aqueous solution of a suitable metal salt or soluble compound such as stannous bromide, stannous chloride, stannic chloride, stannic chloride pentahydrate; or germanium oxide, germanium tetraethoxide, germanium tetrachloride; or lead nitrate, lead acetate, lead chlorate and the like compounds. The utilization of Group IVA(IUPAC 14) metal chloride compounds, such as stannic chloride, germanium tetrachloride or lead chlorate is particularly preferred since it facilitates the incorporation of both the metal component and at least a minor amount of the preferred halogen component in a single step. When combined with hydrogen chloride during the especially preferred alumina peptization step described hereinabove, a homogeneous dispersion of the Group IVA(IUPAC 14) metal component is obtained in accordance with the present invention. In an alternative embodiment, organic metal compounds such as trimethyltin chloride and dimethyltin dichloride are incorporated into the catalyst during the peptization of the inorganic oxide binder, and most preferably during peptization of alumina with hydrogen chloride or nitric acid.

Optionally the catalyst may also contain other components or mixtures thereof that act alone or in concert as catalyst modifiers to improve activity, selectivity or stability. Some known catalyst modifiers include rhenium, gallium, cerium, lanthanum, europium, indium, phosphorous, nickel, iron, tungsten, molybdenum, zinc, and cadmium. Catalytically effective amounts of these components may be added to the carrier material in any suitable manner during or after its preparation or to the catalytic composite before, during or after other components are being incorporated. Generally, good results are obtained when these components constitute about 0.01 to about 5 mass % of the composite, calculated on an elemental basis of each component.

Another optional component of the catalyst, particularly useful in hydrocarbon conversion processes comprising dehydrogenation, dehydrocyclization, or hydrogenation reactions, is an alkali or alkaline-earth metal component. More precisely, this optional ingredient is selected from the group consisting of the compounds of the alkali metals—cesium, rubidium, potassium, sodium, and lithium—and the compounds of the alkaline earth metals—calcium, strontium, barium, and magnesium. Generally, good results are obtained when this component constitutes about 0.01 to about 5 mass % of the composite, calculated on an elemental basis. This optional alkali or alkaline earth metal component may be incorporated into the composite in any of the known ways by impregnation with an aqueous solution of a suitable water-soluble, decomposable compound being preferred.

As heretofore indicated, it is necessary to employ at least one calcination step in the preparation of the catalyst. An essential step of the invention is the high temperature calcination step, also may also be called an oxidation step, which preferably takes place before incorporation of any metals to the support but can be performed after incorporation of any metals. When the high temperature calcination occurs before incorporation of any metals, good results are obtained when a lower temperature oxidation step and an optional halogen adjustment step follow the addition of any metals.

The conditions employed to effect the lower temperature oxidation step are selected to convert substantially all of the metallic components within the catalytic composite to their corresponding oxide form. The oxidation step typically takes place at a temperature of from about 370° C. to about 600° C. An oxygen atmosphere comprising air is typically employed. Generally, the oxidation step will be carried out for a period of from about 0.5 to about 10 hours or more, the exact period of time being that required to convert substantially all of the metallic components to their corresponding oxide form. This time will, of course, vary with the temperature employed and the oxygen content of the atmosphere employed.

In addition to the oxidation step, a halogep adjustment step may also be employed in preparing the catalyst. The halogen adjustment step may serve a dual function. First, the halogen adjustment step may aid in homogeneous dispersion of the Group IVA(IUPAC 14) metal and any other metal components. Additionally, the halogen adjustment step can serve as a means of incorporating the desired level of halogen into the final catalytic composite. The halogen adjustment step employs a halogen or halogen-containing compound in air or an oxygen atmosphere. Since the preferred halogen for incorporation into the catalytic composite comprises chlorine, the preferred halogen or halogen-containing compound utilized during the halogen adjustment step is chlorine, HCl or precursor of these compounds. In carrying out the halogen adjustment step, the catalytic composite is contacted with the halogen or halogen-containing compound in air or an oxygen atmosphere at an elevated temperature of from about 370° C. to about 600° C. Water may be present during the contacting step in order to aid in the adjustment. In particular, when the halogen component of the catalyst comprises chlorine, it is preferred to use a mole ratio of water to HCl of about 5:1 to about 100:1. The duration of the halogenation step is typically from about 0.5 to about 5 hours or more. Because of the similarity of conditions, the halogen adjustment step may take place during the oxidation step. Alternatively, the halogen adjustment step may be performed before or after the calcination step as required by the particular method being employed to prepare the catalyst of the present invention. Irrespective of the exact halogen adjustment step employed, the halogen content of the final catalyst should comprise, on an elemental basis, from about 0.1 to about 10 mass % of the finished composite.

In preparing the catalyst, a reduction step may also be optionally employed. The reduction step is designed to reduce substantially all of the platinum-group metal component to the corresponding elemental metallic state and to ensure a relatively uniform and finely divided dispersion of the component throughout the refractory inorganic oxide. It is preferred that the reduction step takes place in a substantially water-free environrment. Preferably, the reducing gas is substantially pure, dry hydrogen (i.e., less than 20 volume ppm water). However, other reducing gases may be employed such as CO, nitrogen, etc. Typically, the reducing gas is contacted with the oxidized catalytic composite at conditions including a reduction temperature of from about 315° C. to about 650° C. for a period of time of from about 0.5 to 10 or more hours effective to reduce substantially all of the platinum-group metal component to the elemental metallic state. The reduction step may be performed prior to loading the catalytic composite into the hydrocarbon conversion zone or may be performed in situ as part of a hydrocarbon conversion process start-up procedure and/or during reforming of the hydrocarbon feedstock. However, if the in-situ technique is employed, proper precautions must be taken to predry the hydrocarbon conversion plant to a substantially water-free state and a substantially water-free hydrogen-containing reduction gas should be employed.

Optionally, the catalytic composite may also be subjected to a presulfiding step. The optional sulfur component may be incorporated into the catalyst by any known technique.

The catalyst of the present invention has particular utility as a hydrocarbon conversion catalyst. The hydrocarbon is to be converted is contacted with the catalyst at hydrocarbon-conversion conditions, which include 4 temperature of from about 40° C. to about 550° C., a pressure of from about atmospheric to about 200 atmospheres absolute and liquid hourly space velocities from about 0.1 to about 100 $hr^{-1}$. The catalyst is particularly suitable for catalytic reforming of gasoline-range feedstocks, and also may be used for dehydrocyclization, isomerization of aliphatics and aromatics, dehydrogenation, hydrocracking, disproportionation, dealkylation, alkylation, transalkylation, oligomerization, and other hydrocarbon conversions. The present invention provides greater stability and lowered coke production relative to other catalysts known to the art when used to process gasoline-range feedstock as a catalytic reforming catalyst. Preferably, the gasoline-range feedstock has a sulfur content less than 1 part per million. The present invention also provides greater stability and lowered coke production relative to other catalysts known to the art when used in a dehydrogenation process where the catalyst comprises an alkali or alkaline earth metal component.

The following examples will serve to illustrate certain specific embodiments of the present invention. These examples should not, however, be construed as limiting the scope of the invention as set forth in the claims. There are many other possible variations, as those of ordinary skill in the art will recognize, which are within the spirit of the invention.

EXAMPLE 1

A commercially produced, spherical gamma alumina base (Base A), containing 0.3 mass % tin, had an initial surface area of 215 m²/gm. The piece crushing strength of this support was 36.4 N/mm. The apparent bulk density (ABD) of this base was 0.5 grams/cc. This base was subsequently calcined by two methods. The first method, a standard steaming at elevated temperature to lower the surface area, produced Base B, properties of which are listed below. Base C was produced to illustrate the invention. This involved subjecting a layer of support to high temperature calcination in dry air. The moisture level for this experiment was approximately 2.5 mass % water.

|  | Base B (725° C. calcination, 40 mass % steam in air for 4 hours) | Base C (843° C. dry calcination in air for 1.5 hours) |
| --- | --- | --- |
| Surface Area m²/gm | 160.1 | 160 |
| Piece Crush Strength, N | 23.6 | 40.4 |

Base C retained significantly greater mechanical strength, although the surface area was reduced by 55 m²/gm. In surprising contrast, the support that was calcined with steam to the same 160 m²/gm surface area lost mechanical strength. An approximate 30% reduction in piece crush strength was noted for the steamed base, while the dry calcination did not negatively affect the piece crush strength.

EXAMPLE 2

The commercially produced, spherical gamma alumina Base A from example I was used to prepare an additional base (Base D), by calcining Base A in dry air containing approximately 2.5 mass % water at 860° C. for 45 minutes.

Figure 2:
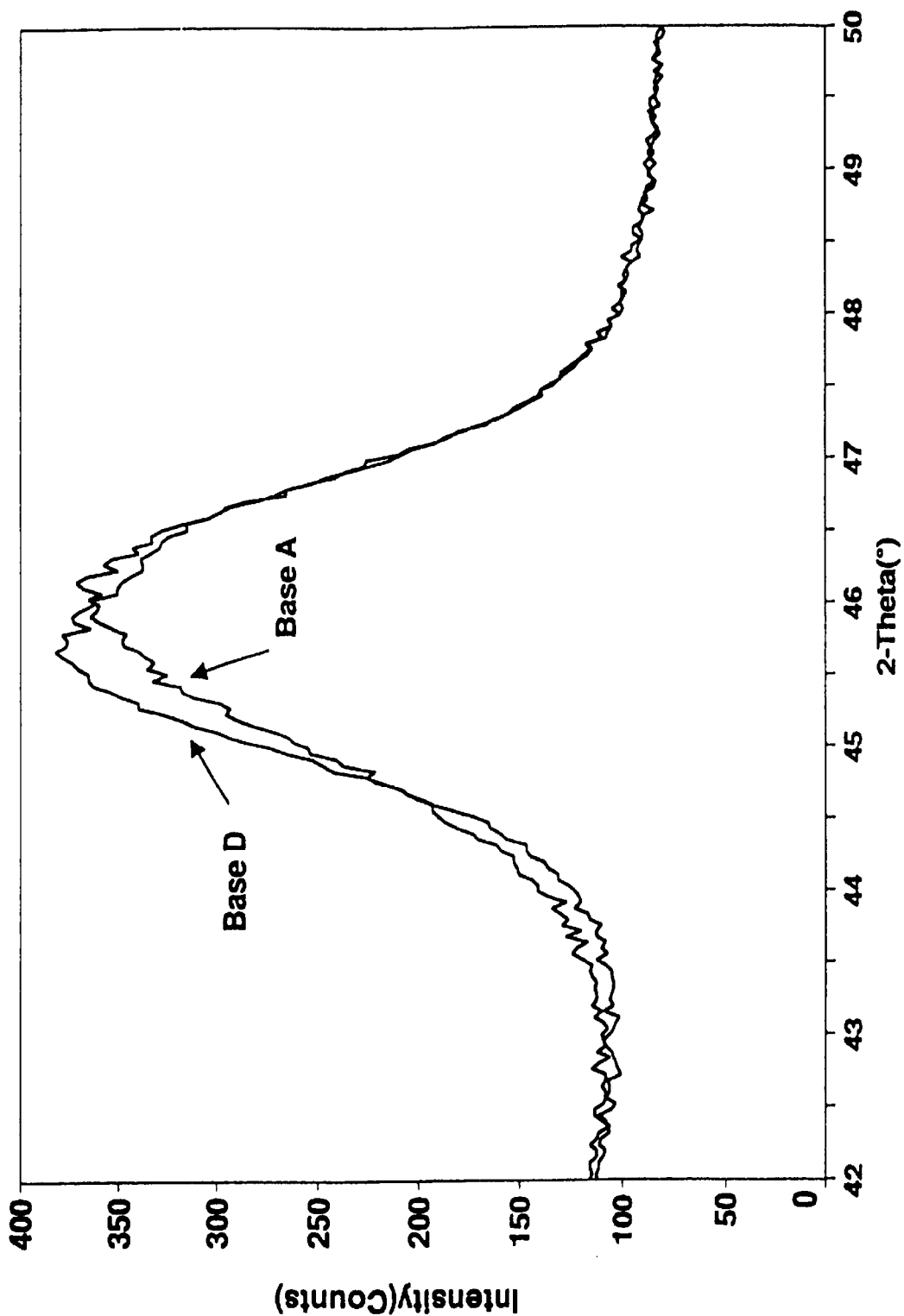
FIG. 2 shows an X-ray diffraction pattern for a catalyst of the invention (Base D) compared to a reference (Base A) over the range 2-theta 50 to 42.

The X-ray diffraction patterns of Base A and Base D were obtained by standard X-ray powder techniques. The diffraction pattern from 43 two-Θ to 26 two-Θ is shown in FIG. 1 and from 50 two-Θ to 42 two-Θ is shown in FIG. 2. These patterns show that the catalyst of the present invention is unique from conventional gamma alumina. Particularly, FIG. 1 shows a broad peak near 33 two-Θ, and FIG. 2 shows a peak near 46 two-Θ is left shifted. The peaks were characterized by taking ratios of peak intensities. The ratios of peak intensities at respective two-Θ Bragg angle values of about 32.5:34.0 and about 46.0:45.5 were determined to be about 1.0 and 1.1 for Base A and about 1.4 and 1.0 for Base D.

What is claimed is:

1. A shaped hydrocarbon conversion catalyst comprising an alumina having an X-ray powder diffraction pattern such that the ratio of peak intensities at respective two-Θ Bragg angle values of 32.5:34.0 is at least about 1.2 and the ratio of peak intensities at respective two-Θ Bragg angle values of 46.0:45.5 is at most about 1.1.

2. The catalyst of claim 1 further comprising at least one platinum group metal dispersed onto the catalyst in an amount from about 0.01 mass-% to about 2.0 mass-% of the catalyst calculated on an elemental basis.

3. The catalyst of claim 2 further comprising a metal promoter component selected from the group consisting of tin, germanium, rhenium, gallium, cerium, lanthanum, europium, indium, phosphorus, nickel, iron, tungsten, molybdenum, zinc, cadmium, and mixtures thereof, wherein the metal promoter comprises from about 0.01 mass-% to about 5.0 mass-% of the catalyst calculated on an elemental basis.

4. The catalyst of claim 2 further comprising a halogen component present in an amount from about 0.1 mass-% to about 10 mass-% of the catalyst calculated on an elemental basis.

5. The catalyst of claim 1 wherein the catalyst has a piece crush strength of greater than about 34 N/mm.

6. The catalyst of claim 5 wherein the piece crush strength is greater than about 40 N/mm.

7. The catalyst of claim 1 wherein the alumina has a surface area from about 140 m²/gm to about 210 m²/gm.

8. The catalyst of claim 7 wherein the surface area is from about 150 m²/gm to about 180 m²/gm.

9. The catalyst of claim 1 wherein the shaped catalyst is substantially spherical or substantially cylindrical.

10. The catalyst of claim 1 further comprising an alkali or alkaline-earth metal dispersed onto the shaped catalyst in an amount from about 0.01 mass-% to about 5.0 mass-% of the catalyst calculated on an elemental basis.

11. A hydrocarbon conversion process comprising contacting a hydrocarbon feedstock with a shaped catalyst at hydrocarbon-conversion conditions to give a converted hydrocarbon, the shaped catalyst comprising an alumina having an X-ray powder diffraction pattern such that the ratio of peak intensities at respective two-Θ Bragg angle values of 32.5:34.0 is at least about 1.2 and the ratio of peak intensities at respective two-Θ Bragg angle values of 46.0:45.5 is at most about 1.1.

12. The process of claim 11 wherein the hydrocarbon-conversion conditions include a temperature of from about 40° C. to about 550° C., a pressure of from about atmospheric to about 200 atmospheres absolute and liquid hourly space velocities from about 0.1 to about 100 hr$^{-1}$.

13. The process of claim 11 wherein the catalyst has a piece crush strength of greater than 34 N/mm.

14. The process of claim 11 wherein the alumina has a surface area from about 140 m²/gm to about 210 m²/gm.

15. The process of claim 14 wherein the hydrocarbon feedstock is a gasoline-range feedstock.

16. The process of claim 11 wherein the shaped catalyst further comprises at least one platinum group metal dispersed onto the shaped catalyst in an amount from about 0.01 mass-% to about 2.0 mass-% of the catalyst calculated on an elemental basis.

17. The process of claim 16 where the process is a catalytic reforming process.

18. The process of claim 11 wherein the shaped catalyst is substantially spherical or substantially cylindrical.

19. The process of claim 11 wherein the catalyst further comprises an alkali or alkaline-earth metal dispersed onto the shaped catalyst in an amount from about 0.01 mass-% to about 5.0 mass-% of the catalyst calculated on an elemental basis.

20. The process of claim 19 wherein the process is a dehydrogenation process.

* * * * *